United States Patent Office 2,745,887
Patented May 15, 1956

2,745,887

DEHYDROGENATION OF NON-AROMATIC CYCLIC COMPOUNDS

Herman Pines, Chicago, and Jerome A. Vesely, Evanston, Ill., assignors to Universal Oil Products Company, Des Plaines, Ill., a corporation of Delaware No Drawing. Application June 15, 1953,
Serial No. 361,875

12 Claims. (Cl. 260—668)

This invention relates to a process for dehydrogenating cyclic compounds and more particularly to a process for dehydrogenating non-aromatic cyclic compounds to form aromatic compounds.

An object of this invention is to provide a novel method for converting non-aromatic cyclic compounds to aromatic compounds by treating the cyclic compounds with an alkali metal or hydride thereof.

Another object of this invention is to provide a novel method for dehydrogenating non-aromatic cyclic compounds to form aromatic compounds by treating said non-aromatic-cyclic compound with a dehydrogenating catalyst selected from the group consisting of alkali metals and hydrides thereof under dehydrogenating conditions.

One embodiment of this invention relates to the conversion of an unsaturated compound containing a six membered carbon atom ring to an aromatic compound.

A specific embodiment of this invention is found in the conversion of an unsaturated compound containing a six carbon atom ring and at least two double bonds per molecule to an aromatic compound in the presence of a dehydrogenation catalyst.

A more specific embodiment of this invention relates to the conversion of an unsaturated compound containing a six carbon atom ring and at least two double bonds per molecule, at least one of said double bonds being in the six carbon atom membered ring to an aromatic compound in the presence of a dehydrogenation catalyst selected from the group consisting of alkali metals and hydrides thereof.

A still more specific embodiment of this invention relates to the dehydrogenation of an unsaturated hydrocarbon containing a six membered carbon atom ring and at least two double bonds per molecule, at least one of said double bonds being in the six carbon atom ring and at least one hydrogen atom on the carbon atoms in the ring which do not contain a double bond, to form an aromatic compound in the presence of a catalyst selected from the group consisting of alkali metals and hydrides thereof under dehydrogenating conditions.

Other objects and embodiments of the invention referring to alternative reactants utilizable as charging stocks in the present process and to alternative catalysts within the scope of the invention will be referred to in greater detail in the following further description of the invention.

It has now been discovered that cyclic diolefins containng a six member ring will undergo a hydrogen disproportionation or dehydrogenation when said olefins are contacted with a catalyst comprising an alkali metal or hydride thereof. Compounds containing a five membered carbon atom ring and having two double bonds per molecule will not undergo dehydrogenation to form aromatic hydrocarbons when contacted with the aforementioned catalysts. An example of this dehydrogenation is the conversion of limonene to p-cymene upon being contacted with a metallic hydride such as sodium hydride or an alkali metal such as sodium.

It is believed that the cyclic compound first undergoes isomerization to form conjugated compounds, which in the case of d-limonene would be conjugated menthadienes, which then undergo dehydrogenation to form aromatic compounds such as p-cymene.

Dehydrogenation of alicyclic compounds to form aromatic compounds is known in the art. When an alkali metal such as sodium is used to catalyze a dehydrogenation process it has been found that an induction period is present during which time little, if any, dehydrogenation takes place. It has been found that the use of an alkali metal in the presence of a halogenated aromatic such as o-chlorotoluene, at atmospheric pressure, requires an induction period of from 3–5 hours before the dehydrogenation process is readily under way. However, higher temperatures, which can be achieved at superatmospheric pressures the dehydrogenation process proceeds immediately. The use of an alkali metal alone as a catalyst, at atmospheric pressure, results in an induction period from 12 to 15 hours before there is a marked and accelerating evolution of gas which is indicative of the dehydrogenation process. However, when a hydride of the metal is used as a catalyst a gasification which shows dehydrogenation of the cyclic compound is evident as soon as the reactants and the catalysts reach the desired temperature.

As heretofore stated, the dehydrogenation of the non-aromatic cyclic compounds, such as diolefins, proceeds readily when said compounds contain six carbon atoms in the cyclic ring and at least two double bonds, at least one of said double bonds being in the six membered ring and at least one hydrogen atom on the carbon atoms which do not contain the double bond. Other cyclic compounds besides limonene include dipentene, terpinolene, $\alpha$-,$\beta$-,$\gamma$-terpinene, $\alpha$- or $\beta$-phellandrene, sylvestrene, carvestrene, etc.

The catalysts used in this reaction include the hydrides of alkali metals and alkaline earth metals such as calcium hydride, barium hydride, strontium hydride, lithium hydride, sodium hydride, potassium hydride, magnesium hydride, and mixtures thereof such as calcium lithium hydride, calcium barium hydride, lithium potassium hydride, etc. Other metallic hydrides which may be used as catalysts in this reaction include aluminum hydride or combinations of aluminum hydride with any of the aforesaid alkali or alkaline earth metals including lithium aluminum hydride, calcium aluminum hydride, sodium aluminum hydride, etc. Metalloid hydrides such as boron hydride may also be used within the scope of this invention, although not necessarily with equivalent results.

For purpose of this invention the term "alkali metal," when pertaining to a catalyst, embraces both alkali metals and alkaline earth metals including sodium, potassium, magnesium, lithium, strontium, rubidium, barium and calcium. When employed as catalysts for the present process these metals may be used alone or in combination with each other or with other metals outside of this class.

It has also been discovered that the addition of promoters consisting of organic compounds which react with the alkali metals to form alkali organic compounds facilitates the dehydrogenation of the alicyclic compounds. The organic promoters which combine with a metal to form organometallic compounds include acetylenic compounds such as acetylene, methylacetylene, ethylacetylene, pentyne, hexyne, heptyne, etc., heterocyclic nitrogen compounds such as pyridine, picoline and other alkyl pyridines, quinoline, isoquinoline, pyrrole, piperidine, etc., polynuclear aromatic compounds such as anthracene, dihydroanthracene, fluorene, phenanthrene, tetralin, etc., halogenated aromatic compounds such as o-chlorotoluene, o-bromotoluene, o-chloroethylbenzene, o-chloropropylbenzene, o-bromoethylbenzene, etc. In the present invention sodium is the preferred alkali metal due to its relatively lower cost and availability. The amount of alkali metal and organic promoter used will depend upon the particular cyclic compound undergoing dehydrogenation. In general an excess of alkali metal over the organic promoter is employed, thus insuring the presence of free metal as well as an organometallic salt.

It is also contemplated within the scope of this invention that cyclic mono-olefins such as cyclohexene, methylcyclohexene, ethylcyclohexene, propylcyclohexene, etc., dimethylcyclohexenes, diethylcyclohexenes, etc., cyclic di-olefins such as cyclohexadienes, methylcyclohexadienes, ethylcyclohexadienes, non - geminal diethylcyclohexadienes, etc., may also undergo dehydrogenation when contacted with an alkali metal or hydride thereof of the class hereinbefore set forth.

The process of this invention may be effected in any suitable manner and may be either a batch or continuous type operation. When a batch type operation is used, a quantity of the starting materials, namely the unsaturated hydrocarbons containing a six membered carbon atom ring and the catalyst, are placed in a reaction vessel equipped with a reflux condenser and a mixing device, after which the reaction vessel is heated to the desired temperature while the contents thereof are mixed. After a suitable time has elapsed, the reactor and its contents are cooled to room temperature, the desired product then being recovered by conventional means, for example, by fractional distillation.

Another method of operation of the present process is of the continuous type. A particularly suitable type of operation comprises a fixed bed type in which the catalyst is disposed as a bed in a reaction zone provided with gas outlet means, and the unsaturated hydrocarbon containing a six membered carbon atom ring passed therethrough in either an upward or downward flow. The unsaturated hydrocarbon may be heated while in the reaction zone or may be heated prior to admittance into said zone and kept at the desired temperature while therein. In the event that the process is carried out under atmospheric pressure the refluxing of the reaction will continue until a desired time has elapsed after which the reaction product will be withdrawn from the zone while the unreacted unsaturated hydrocarbon will be recycled for use as a portion of the feed material. If the reaction is run at higher temperatures and under superatmospheric pressures the reaction time required for dehydrogenation can be shortened.

Another continuous type process is the fluidized type of operation in which the unsaturated hydrocarbon and the catalyst are maintained in a state of turbulence under hindered settling conditions in a reaction zone while the refluxing operation, if necessary, continues. Another continuous type of process includes the compact moving bed type of operation in which the catalyst and the unsaturated hydrocarbon pass either concurrently or countercurrently to each other. Still another type of continuous process is the slurry type process, in which the catalyst is carried into the reaction zone as a slurry in the unsaturated hydrocarbon. In each of the aforementioned types of processes the unreacted unsaturated hydrocarbons may be separated out and recycled for use as a portion of the feed material while the desired product is withdrawn and purified. The gas formed during the reaction time is withdrawn from the reaction zones by appropriate means.

The conditions under which the dehydrogenation of unsaturated hydrocarbons containing a six carbon atom ring and at least two double bonds to aromatic compounds takes place will depend upon the particular compounds used in the process. Both the temperatures and the pressures used in the reaction will vary according to the particular compounds used, the temperature being the more important criterion as to whether or not the dehydrogenation will occur. When lower boiling unsaturated hydrocarbons such as cyclohexadiene are used, the reaction will be carried out under superatmospheric pressures. However, if unsaturated hydrocarbons, such as dipropylcyclohexadienes, which boil at much higher temperatures are to be dehydrogenated, the reaction will take place at atmospheric pressure. The temperatures under which the dehydrogenation will occur range from about 100° C. to about 400° C. or more, the preferred range being from about 160° C. to about 300° C. The length of the reaction time will also vary according to the particular compound utilized as feed stock.

The following examples are given to illustrate the process of the invention which, however, are not intended to limit the generally broad scope of the present invention in strict accordance therewith.

*Example I*

46.1 g. of d-limonene, 3.5 g. of sodium and 1.0 g. of o-chlorotoluene were placed in a vessel provided with a reflux condenser and heating means. In this experiment the reflux condenser was connected to a gas-collecting bottle to record the amount of gas produced by the dehydrogenation. The reaction vessel was heated to a temperature of approximately 175° C. After an induction period of from 4 to 5 hours during which time little or no gas was formed, a steadily accelerating gasification occurred. At the end of the reaction time of 20 hours it was found that 4.15 liters of gas were collected. By means of a mass spectograph analysis, the gas was found to consist solely of hydrogen. The liquid reaction product was separated from the unreacted starting materials and subjected to fractional distillation. Infrared and ultraviolet analyses of the reaction product disclosed the presence of 55% p-cymene and approximately 31% of conjugated menthadiene or menthadienes.

*Example II*

26.2 grams of d-limonene and 4.2 grams of sodium hydride were placed in a reaction vessel similar to that described in Example I. Heat was applied to the reaction vessel and the mixture was refluxed for a period of 28 hours at a temperature of approximately 174° C. At the end of this reaction time, 2.94 liters of gas had been collected. The liquid reaction product was separated from the unreacted starting materials and subjected to fractional distillation. The first cut of the distillate boiling at 170–174° C. was separated and subjected to infrared and ultraviolet analyses which disclosed the presence of 71% p-cymene and approximately 16% conjugated hydrocarbons. The dehydrogenation of the d-limonene in this example proceeded immediately and no induction period, during which the reaction was not proceeding, was observed.

We claim as our invention:

1. A process for the dehydrogenation of a non-aromatic cyclic hydrocarbon containing a six carbon atom ring and at least two double bonds per molecule, at least one of said double bonds being in said ring, to form an aromatic compound which comprises the step of heating said non-aromatic cyclic hydrocarbon at a dehydrogenating temperature of from about 100° C. to about 400° C. in contact with a catalyst selected from the group consisting of the alkali and alkaline earth metals and hydrides thereof.

2. A process for the dehydrogenation of a non-aromatic cyclic hydrocarbon containing a six carbon atom ring and at least two double bonds per molecule, at least one of said double bonds being in said ring, to form an aromatic compound which comprises the step of heating said non-aromatic cyclic hydrocarbon with sodium at a dehydrogenating temperature of about 100° C. to about 400° C.

3. A process for the dehydrogenation of a non-aromatic cyclic hydrocarbon containing a six carbon atom ring and at least two double bonds per molecule, at least one of said double bonds being in said ring, to form an aromatic compound which comprises the step of heating said non-aromatic cyclic hydrocarbon with sodium in the presence of an organic promoter at a dehydrogenating temperature of about 100° C. to about 400° C.

4. A process for the dehydrogenation of a non-aromatic cyclic hydrocarbon containing a six carbon atom ring and at least two double bonds per molecule, at least one of said double bonds being in said ring, to form an aromatic compound which comprises the step of heating said non-aromatic cyclic hydrocarbon with sodium in the presence of o-chlorotoluene at a dehydrogenating temperature of about 100° C. to about 400° C.

5. A process for the dehydrogenation of a non-aromatic cyclic hydrocarbon containing a six carbon atom ring and at least two double bonds per molecule, at least one of said double bonds being in said ring, and at least one hydrogen atom on the carbon atoms of the ring which do not contain a double bond which comprises heating said non-aromatic cyclic hydrocarbon with a catalyst selected from the group consisting of the alkali and alkaline earth metals and hydrides thereof at a temperature of from about 100° C. to about 400° C.

6. A process for the dehydrogenation of a non-aromatic cyclic hydrocarbon containing a six carbon atom ring and at least two double bonds per molecule, at least one of said double bonds being in said ring, and at least one hydrogen atom on the carbon atoms of the ring which do not contain a double bond which comprises heating said non-aromatic cyclic hydrocarbon with an alkali metal catalyst at a temperature of from about 160° C. to 300° C.

7. A process for the dehydrogenation of d-limonene to form p-cymene which comprises the step of heating said limonene with a catalyst selected from the group consisting of alkali metals and hydrides thereof, under dehydrogenating conditions.

8. A process for the dehydrogenation of d-limonene to form p-cymene which comprises the step of heating said limonene with sodium under dehydrogenating conditions.

9. A process for the dehydrogenation of d-limonene to form p-cymene which comprises the step of heating said limonene with sodium hydride under dehydrogenating conditions.

10. A process for the dehydrogenation of d-limonene to form p-cymene which comprises the step of heating said limonene with sodium hydride at a temperature of about 175° C.

11. A process for producing an aromatic hydrocarbon from a non-aromatic cyclic diolefin hydrocarbon containing a six carbon atom ring and having one of its double bonds in said ring and the other in a side chain on the ring, which comprises contacting said diolefin hydrocarbon at a dehydrogenating temperature of from about 100° C. to about 400° C. with a catalyst selected from the group consisting of the alkali and alkaline earth metals and hydrides thereof.

12. A process for producing an aromatic hydrocarbon from a non-aromatic cyclic diolefin hydrocarbon having both of its double bonds in a six carbon atom ring, which comprises contacting said diolefin hydrocarbon at a dehydrogenating temperature of from about 100° C. to about 400° C. with a catalyst selected from the group consisting of the alkali and alkaline earth metals and hydrides thereof.

References Cited in the file of this patent

UNITED STATES PATENTS

| | | |
|---|---|---|
| 2,376,308 | Dixon | May 15, 1945 |
| 2,420,749 | Ipatieff | May 20, 1947 |
| 2,431,756 | Ipatieff | Dec. 2, 1947 |
| 2,448,641 | Whitman | Sept. 7, 1948 |

OTHER REFERENCES

Lindstead: "Jour. Chem. Soc." (London), 1940, pp. 1139–1147.